United States Patent [19]
Coxon

[11] Patent Number: 5,421,449
[45] Date of Patent: Jun. 6, 1995

[54] ANGLE STATION

[75] Inventor: Alan Coxon, Tyne & Wear, England

[73] Assignee: Huwood International Limited, England

[21] Appl. No.: 204,347

[22] PCT Filed: Sep. 14, 1992

[86] PCT No.: PCT/GB92/01677
 § 371 Date: Mar. 11, 1994
 § 102(e) Date: Mar. 11, 1994

[87] PCT Pub. No.: WO93/06028
 PCT Pub. Date: Apr. 1, 1993

[30] Foreign Application Priority Data

Sep. 13, 1991 [GB] United Kingdom ............... 9119572

[51] Int. Cl.⁶ .............................................. B65G 21/16
[52] U.S. Cl. ................................................... 198/839
[58] Field of Search ...................................... 198/839

[56] References Cited

U.S. PATENT DOCUMENTS

| 2,212,006 | 8/1940 | Buchanan | 198/839 |
| 3,016,127 | 1/1962 | Cooper | 198/839 |
| 3,184,043 | 5/1965 | Gibbon | 198/839 |
| 4,655,340 | 4/1987 | Steel | 198/839 |

FOREIGN PATENT DOCUMENTS

| 746881 | 1/1944 | Germany . | |
| 1133668 | 7/1962 | Germany | 198/839 |
| 0709019 | 5/1954 | United Kingdom | 198/839 |
| 709019 | 5/1954 | United Kingdom . | |
| 1048256 | 11/1966 | United Kingdom . | |
| 1207910 | 1/1986 | U.S.S.R. | 198/839 |
| 1234294 | 5/1986 | U.S.S.R. | 198/839 |

Primary Examiner—James R. Bidwell
Attorney, Agent, or Firm—Bell, Seltzer, Park & Gibson

[57] ABSTRACT

In an angle station for lateral angular displacement of an endless conveyor belt in a conveyor system, the angle station comprises a belt guide in the form of a plurality of large diameter guide rollers mounted in support brackets on a support structure with the rollers substantially clear of the support structure. The guide rollers are generally elongate and arranged substantially normal to a substantially helical pathway for the belt around the belt guide. The guide rollers are disposed in axially and laterally, closely spaced relation, so as to define a generally continuous support for a conveyor belt in use of the angle station, which support is substantially non-angular in cross-section along the helical pathway. A roller support bracket is provided for use in the angle station as well as a guide roller unit including a guide roller mounted in such bracket.

15 Claims, 3 Drawing Sheets

ANGLE STATION

The present invention relates to angle stations in or for endless conveyor belts, as well as to guide roller units and guide roller support brackets for use therein.

The use of angle stations in conjunction with endless conveyors is not new, with such prior art being described in the patents of Mayor & Coulson Ltd. GB 520,744 "Improvements in or connected with conveyors of the belt type" and Anderson Strathclyde PLC GB 2,156,760 "Angle stations in or for endless conveyor belts". The main function and purpose of an angle station, is to enable an endless conveyor to change its direction of travel laterally e.g. in order to negotiate a bend along its route.

To date the most popular method of performing radial or lateral angular conveyor deviation, was to have an arrangement of two or more separate endless conveyors which were so aligned as to overlap each other at the point of required deviation, thus acting in principle as one single conveyor.

The advantage of using an angle station instead of this overlaid system is that in terms of its constructional and operational features it is a much more efficient method of performing the same function due to the fact that it requires only one conveyor drive. This not only reduces the initial installation, maintenance and repair costs, but also drastically reduces the amount of space required for its siting.

The basic principle behind most angle stations is to allow an endless conveyor belt to move over a helical path of low frictional resistance, invariably provided by some form of guide roller arrangement. Although such angle station constructional arrangements are well known, previous designs have never fully achieved commercial or technical success in such hostile industrial environments as mines, quarries and ore plants. This has been due to various reasons including the use of a multitude of essentially small diameter rollers which suffer from the great disadvantages of lack of inherent strength due to their small size and that they wear out relatively quickly due to their high rotational speeds giving rise to high maintenance costs. They are also prone to seizure due to the ingress and accumulation of debris and particulate foreign matter which can readily become trapped in the confined spaces around such small diameter rollers° Also where rollers are relatively widely separated laterally of each other the belt pathway becomes substantially angular so that the endless belt suffers a large amount of bending and straightening as it traverses the rollers resulting in considerable wear and energy losses.

It is an object of the present invention to avoid or minimise one or more of the above disadvantages.

According to this invention a guide member is so designed and constructed as to provide for rolling contact between it and the conveyor belt it is supporting, with the rolling motion taking place in the direction of conveyor belt travel at the point where contact occurs, and the contact being so configured as to provide support for the belt in a generally convex or cambered manner correspondingly more or less closely with the natural transverse curvature of the belt.

This rolling contact is preferably achieved by means of a plurality of idler rolling members, means for the releasable interchangeable support mounting of said rolling members, support mountings on a surface, usually cylindrical in form, each of these rolling members to be capable of independent rotation to other rolling members about an axis not normal to the direction of movement of the belt (i.e. they do not castor).

In one aspect the present invention provides an angle station for lateral angular displacement of an endless conveyor belt in a conveyor system, which angle station comprises a belt guide means in the form of a plurality of large diameter guide rollers individually mounted in support brackets on a support structure with said rollers substantially clear of said support brakcets and support structure, said guide rollers being generally elongate and arranged substantially normal to a substantially helical pathway for said belt around said belt guide means, with said guide rollers in axially and laterally, closely spaced relation, so as to define a generally continuously curved support for a said conveyor belt in use of the angle station, which support is substantially non-angular in cross-section along said helical pathway, characterised in that said support brackets are generally 'U'-shaped with a generally concave, part-cylindrical surface, base formed and arranged for complementary engagement with a cylindrical support surface of said support structure such that the plane of said brackets is substantially normal to said helical pathway.

Thus with an angle station of the present invention the belt is substantially supported for movement over a substantially continuously curved pathway thereby reducing wear thereof, by means of a closely packed arrangement of large diameter rollers which has low maintenance as a result of low rotational roller speeds, higher inherent strength due to their larger size and inherent resistance to damage from large amounts of foreign particulate matter such as are to be found in mining operations and the like.

It will be understood that where such large diameter rollers are used, it is particularly important for the rollers to be precisely aligned so as to minimise mis-tracking of the belt. This can give rise to relatively high manufacturing costs with conventional constructions. In a further aspect though the present invention provides a new form of construction using a cylindrical support surface and specially shaped roller support brackets which greatly simplify accurate mounting of the rollers.

Thus in another aspect the present invention provides a roller support bracket suitable for use in mounting a guide roller along a helical pathway around a cylindrical support surface, which bracket has at least one concave, part-cylindrical surface, base portion having a radius of curvature corresponding substantially to that of said cylindrical support surface, and upstanding spaced apart opposed lug means provided with guide roller mounting portions formed and arranged for mounting respective end portions of the guide roller on a guide roller rotational axis angularly offset from the longitudinal axis of said part-cylindrical surface of the bracket base, so that said guide roller is supported substantially normally to said helical pathway, in use of the bracket.

In a further aspect the present invention provides a guide-roller unit comprising an elongate roller and a support bracket of the present invention, therefor.

Preferably the guide rollers are sufficiently large such that the full width of the belt may be substantially supported by from two to four, most preferably three, of said rollers extending in series across the belt pathway. Desirably each roller has a length of from 0.2 to 0.35 times, advantageously about 0.28 times, the width (nominal) of the belt. The rollers are relatively large with respect to the diameter of the helical pathway such that the maximum diameter of the rollers is desirably from 0.15 to 0.27 times, advantageously 0.21 times, the helical pathway diameter.

The guide rollers are desirably cambered so as to present a support which is substantially non-angular in cross-section transversely of the helical belt pathway and/or generally conforms to the natural curvature of the belt therealong. Advantageously the camber of the rollers has a radius relative to the pitch of the helical pathway such that the guide rollers together define a substantially continuous circular profile when viewed axially of the helical pathway.

Further preferred features and advantages of the invention will appear from the following detailed description given by way of example of a specific preferred embodiment of the invention illustrated with reference to the accompanying drawings in which.

Figure 2:
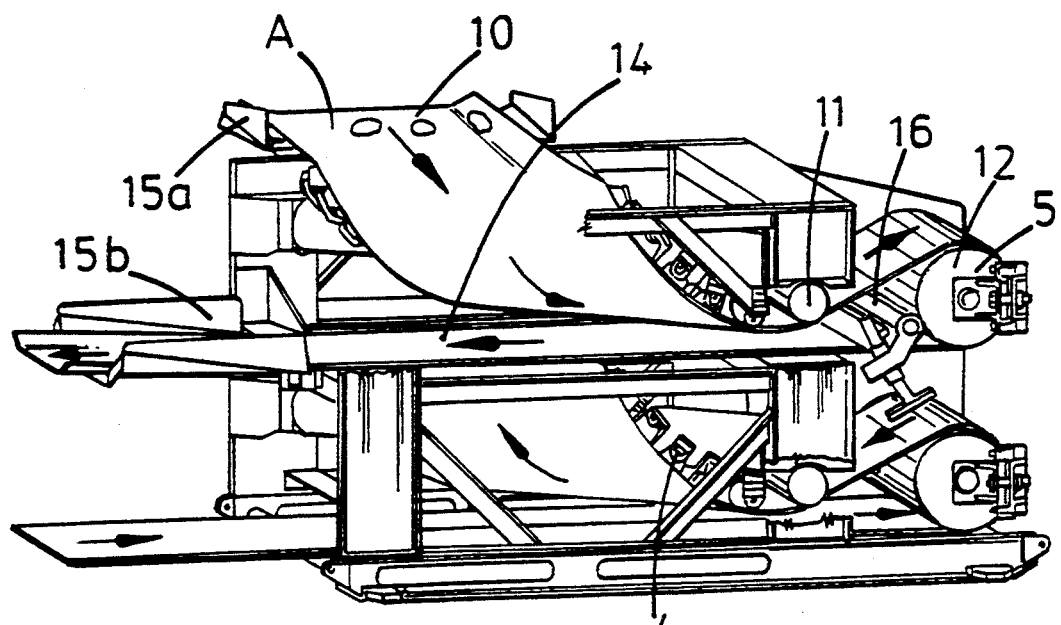
FIG. 2 is a partially cut-away general perspective view of the angle station of FIG. 1.
Figure 3:
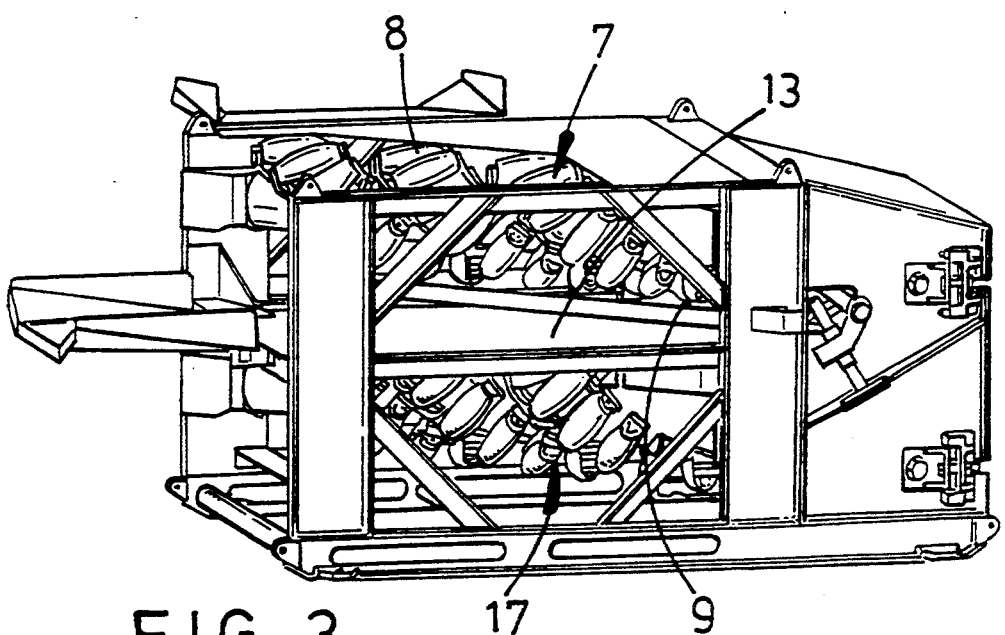
Figure 4:
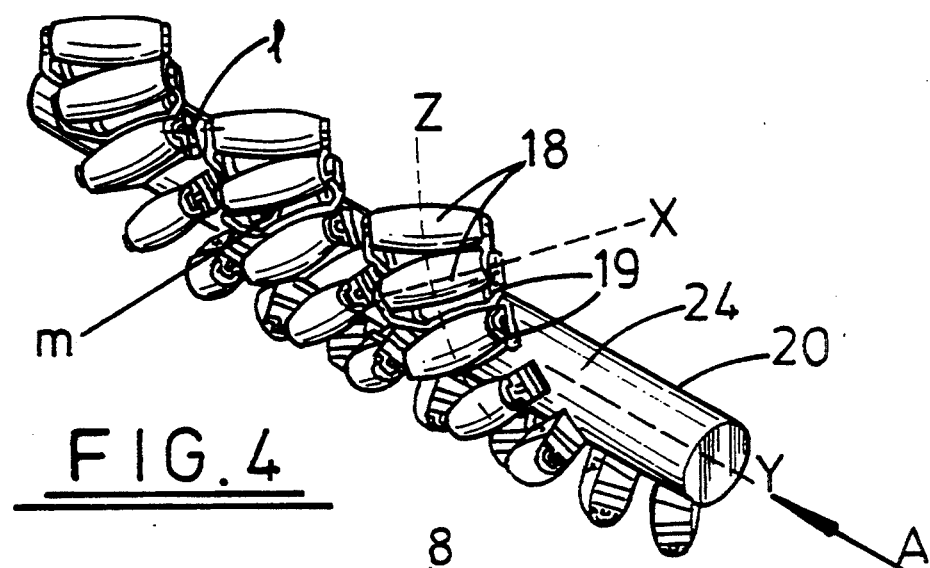
Figure 5:
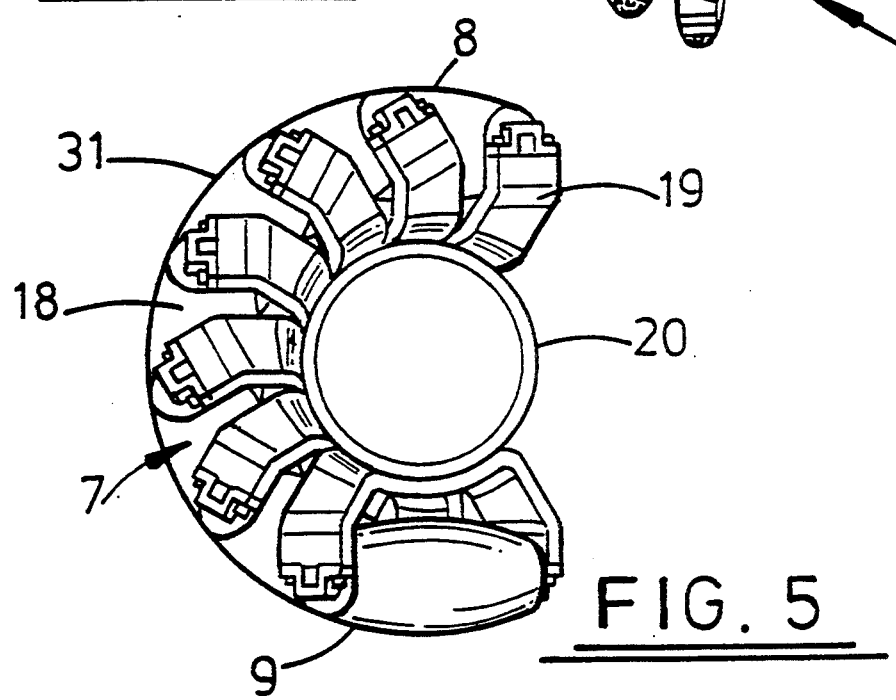
Figure 6:
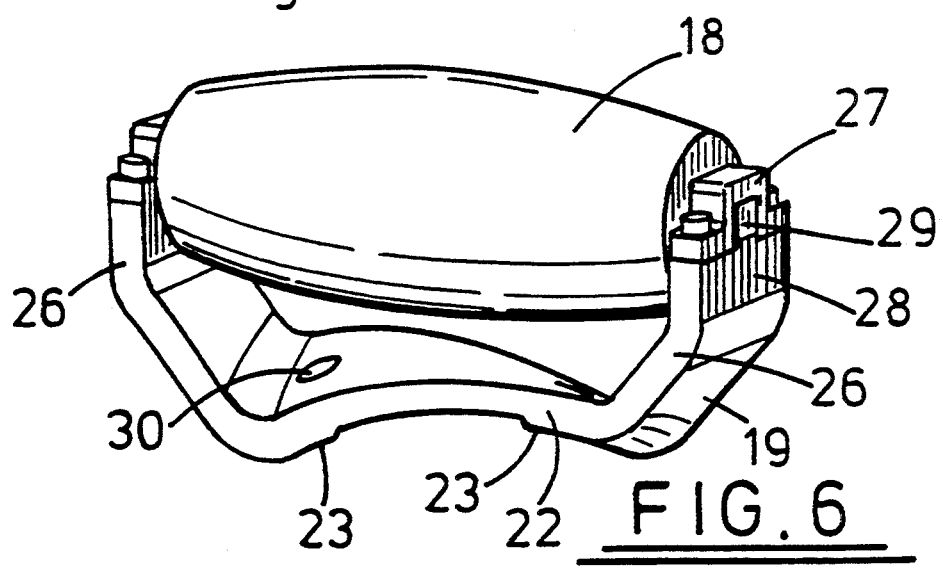

FIG. 3 corresponds to FIG. 2 but with the conveyor belt omitted to show the arrangement of guide rollers in the angle station;

FIG. 4 is a detail perspective view of the helical assembly of rollers of the angle station of FIG. 2 on its cylindrical support;

FIG. 5 is an end view of the assembly of FIG. 4;

FIG. 6 is a detail perspective view of a single guide roller unit of the assembly of FIG. 4;

FIGS. 7 and 8 are perspective views of the support bracket of the unit of FIG. 6.

Figure 1:
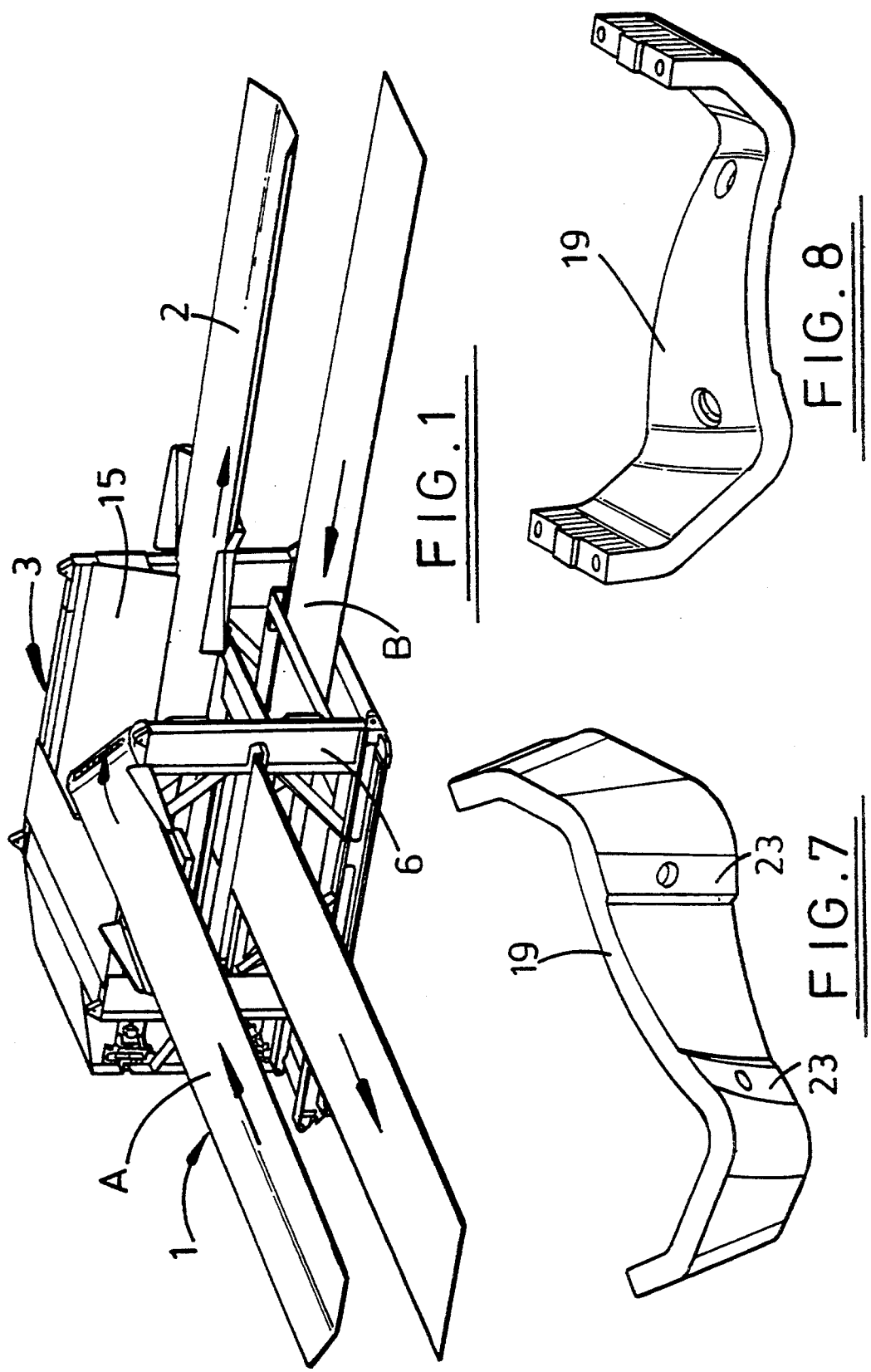
FIG. 1 is a general perspective view of part of an endless conveyor belt installation including an angle station of the invention.

FIG. 1 shows part of a conveyor belt installation 1 with an endless conveyor belt 2 routed through a conveyor belt angle station 3 over and around a plurality of guide rollers 4 and return support rollers 5 (see FIGS. 2 and 3) mounted on a support framework 6.

In more detail as shown in FIG. 2 an incoming reach A of the belt 2 is routed along a helical belt pathway which has a length of one half of a turn (180°) and extends around a first helical roller assembly 7 from an upper side 8 to a lower side 9 thereof (see also FIG. 5). Having passed over the first helical roller assembly 7 and having deposited any material 10 thereon, the belt is now urged first under a snub pulley 11 and then around a cylinder, in this instance a drum 12 before finally emerging from the angle station 3. An impact plate 13 is positioned under the belt 2 in the region of the material discharge/transfer zone 14 in the angle station 3 whose function is the prevention of belt distortion, which occurs due to the weight of conveyed material 10 falling onto the belt 2. Also situated at this delivery/discharge zone are a number of spill plates 15 (see FIG. 1) which are so arranged as to prevent any conveyed material 10 from falling off the belt 2 during transfer thereof at this conveyor belt axis changeover. The angle station 3 is also provided with a scraper device 16 whose function is to clean the surface of the belt 2 prior to its travelling around the drum 12.

As the incoming belt 2 traverses the angle station 3 it is directed over partially troughed guide plates 15a, 15b in generally conventional manner. Thus there are two forms of guide plate used: one 15a situated at the entrance to the angle station 3 which alters the profile of the incoming belt 2 from troughed to flat, and the second 15b being situated at the angle station belt exit which transforms the belt 2 back from a flat to a troughed profile.

The return reach of belt B now devoid of material follows a reverse path to that of the incoming belt reach A through the angle station 3. On entering the angle station 3 the belt 2 is directed under a scraping device, in this instance a plough (not shown) which cleans the belt 2 of any material 10 still adhering to it. Once cleaned it then goes around the drum 12 where another scraping device (not shown) cleans the other side of this belt, then under the snub pulley 11 and finally over a second helical assembly of rollers 17.

In more detail each of the helical guide roller assemblies 7, 17 comprises a closely packed array of large diameter, cambered, rollers 18 each mounted in a support bracket 19 secured to a support structure in the form of a pipe 20 fixed to the support framework 6.

The brackets 19 are generally strip form and 'U'-shaped with an upwardly arcuate base portion 22 which presents a concave generally part-cylindrical surface with spaced apart engagement portions 23 which are substantially complementary to the cylindrical support surface 24 presented by the pipe 20.

As may be seen from the drawings, the opposite side members 26 of the 'U'-shaped bracket 19 form upstanding spaced apart opposed lugs with guide roller mounting portions 27 at their distal ends 28 for mounting respective end portions 29 of the guide roller 18 with the guide roller rotational axis X angularly offset from the longitudinal axis Y so that the guide roller 18 is supported substantially normally to the helical belt pathway Z defined around the roller assembly 7.

It will be understood that this angular offset will be directly related to the pitch of the helical pathway Z (for a given pipe support diameter) and hence the angular change in conveying direction defined by the angle station. In accordance with this preferred form of construction of the present invention, different angular changes of conveying direction are provided by the use of brackets with corresponding angular offsets and support pipes mounted with corresponding angular offsets.

The base portion 22 of the bracket 19 has two apertures 30 which line up with corresponding apertures drilled or otherwise formed in the pipe 20 for receiving securing bolts therethrough for securing of the brackets 19 to the pipe support 20 for precise and easy production of the helical roller assembly 7, 17. As may be seen in FIG. 6 the roller 18 is supported well clear of the bracket 19 and hence the pipe support 20 thereby minimising the possibility of particulate material from the conveyor belt on the angle station surroundings becoming trapped and damaging the rollers or their bearings.

As shown in FIG. 4, each roller assembly 7, 17 comprises three parallel series each of seven helically arranged rollers 18.

In the illustrated helical roller assemblies 7, 17, the rollers in adjacent series are axially aligned, with three rollers 18 extending end-to-end across the full width of the belt 2 in a central part of the helical pathway, reducing to two and then one roller towards the respective end portions of the helical belt pathway.

As shown in FIG. 4 the rollers 18 are closely packed so that the lateral spacing m between adjacent rollers 18 along the helical pathway is relatively small e.g. about 0.57 times the maximum diameter of the rollers 18, and the axial spacing l between adjacent rollers across the helical pathway is about 0.48 times the length of the roller 18. As previously noted the rollers 18 are relatively large with a diameter (at their widest, central, part) of around 0.21 times the diameter of the helical pathway defined by the outermost surface of the helical roller assembly (see FIG. 5), which in turn is about 0.55 times the nominal belt width. The length of the rollers 18 is about 0.28 times the nominal belt width.

As may be seen in FIG. 5, the radius of the camber on the rollers 18 is selected so that the roller assembly 7, 17 presents a substantially cylindrical outer surface 31 for supporting the conveyor belt 2.

If desired the outer series of rollers may be inclined forwardly at their outer-ends e.g. by about 3°, to provide a "toe-in" effect in order to improve tracking of the belt e.g. by using a slightly modified angular offset in the bracket, or, more conveniently, by using slightly modified roller mounting portions.

The brackets are conveniently made by casting e.g. of cast iron.

It will be appreciated that various modifications may be made to the abovedescribed embodiment without departing from the scope of the present invention as defined in the appended claims. Thus whilst the angle station illustrated provides an angular change of conveyor belt direction of 90° a wide range of angle changes, e.g. from 15° to 165°, may be provided by suitable choice of the angular offset on the brackets used and the angular arrangement of the support pipe 20 and end support or return rollers/drums 12 relative to the incoming reach A of the conveyor belt 2. It will also be appreciated that two or more angle stations may be used in series e.g. to provide a more gradual change of direction and/or to provide a different angular change of direction using angle stations with predetermined changes of direction e.g. combining 30° and 45° angle stations to provide a 75° angular change of direction, or simply to provide a lateral offset of or dog-leg in the conveyor belt e.g. by using two oppositely-handed 90° angle stations.

Whilst a cylindrical pipe provides a particularly convenient form of support for the guide roller units (comprising guide rollers and brackets therefor), it will be appreciated that other forms of tubular support e.g. polygonal section tube, or a suitable framework of structural members, could be used instead with suitably formed brackets, provided that the close packed helical arrangement of the guide rollers is maintained.

What is claimed is:

1. An angle station for lateral angular displacement of an endless conveyor belt in a conveyor system, which angle station comprises a belt guide means in the form of a plurality of large diameter guide rollers individually mounted in support brackets on a support structure with said rollers substantially clear of said support brackets and support structure, said guide rollers being generally elongate and arranged substantially normal to a substantially helical pathway for said belt around said belt guide means, with said guide rollers in axially and laterally, closely spaced relation, so as to define a generally continuously curved support for a said conveyor belt in use of the angle station, which support is substantially non-angular in cross-section along said helical pathway, characterised in that said support brackets are generally 'U'-shaped with a generally concave, part-cylindrical surface, base formed and arranged for complementary fixed engagement with the outer surface of a cylindrical support surface of said support structure in a predetermined angular relation to the central longitudinal axis of said cylindrical support surface such that the plane of said brackets is substantially normal to said helical pathway.

2. An angle station according to claim 1 for a conveyor belt having a predetermined width, wherein said guide rollers have a length such that from two to four of said rollers are required to support substantially the full width of the belt on said continuously curved support.

3. An angle station according to claim 2 wherein the guide rollers have a length such that three of said rollers are required to support substantially the full width of the belt on said continuously curved support.

4. An angle station according to claim 2 wherein said rollers are of cambered form and have a radius relative to the pitch of the helical pathway such that the guide rollers together define a substantially continuous circular profile when viewed axially of the helical pathway.

5. An angle station according to claim 1 for a conveyor belt having a predetermined width wherein said helical path has a diameter of from 0.5 to 0.7 times the width of the belt.

6. An angle station according to claim 4 wherein said guide rollers have a diameter of from 0.15 to 0.27 times the diameter of the helical path.

7. An angle station according to claim 6 wherein said guide rollers have a lateral separation of from 0.3 to 0.9 times the diameter of the guide rollers.

8. An angle station according to claim 2 wherein said guide rollers have an axial separation of from 0.35 to 0.7 times the length of the guide rollers.

9. An angle station according to claim 1 wherein said helical path has a length of one half of a turn.

10. An angle station according to claim 1 wherein said helical path has a pitch such that the opposite ends of said path have a predetermined lateral angular displacement of from 15° to 165°.

11. An angle station according to claim 1 wherein the laterally outward rollers are inclined inwardly towards each other by a small angle so as to assist tracking of the conveyor belt in use of the angle station.

12. An angle station according to claim 1 wherein is provided a second said belt guide means for supporting a return run of the conveyor belt in use of the angle station.

13. A roller support bracket suitable for use in fixedly mounting a guide roller along a helical pathway around the outer surface of a cylindrical support surface, which bracket has at least one concave, part-cylindrical surface, base portion having a radius of curvature corresponding substantially to that of said cylindrical support surface, and upstanding spaced apart opposed lug means provided with guide roller mounting portions formed and arranged for mounting respective end portions of the guide roller on a guide roller rotational axis angularly offset from the longitudinal axis of said part-cylindrical surface of the bracket base, so that said guide roller is supported substantially normally to said helical pathway, in use of the bracket.

14. A bracket according to claim 13, which bracket is generally 'U'-shaped and generally strip-form.

15. A guide-roller unit suitable for use in supporting a conveyor belt along a helical pathway around a cylindrical support surface, which unit comprises an elongate roller and a support bracket having at least one concave, part-cylindrical surface, base portion having a radius of curvature corresponding substantially to that of said cylindrical support surface, and upstanding spaced apart opposed lug means provided with guide roller mounting portions formed and arranged for mounting respective end portions of the guide roller on a guide roller rotational axis angularly offset from the longitudinal axis of said part-cylindrical surface of the bracket base, so that said guide roller is supported substantially normal to said helical pathway, in use of the bracket.

* * * * *